Patented Nov. 4, 1952

2,616,895

UNITED STATES PATENT OFFICE 2,616,895

IMINODIBENZYL DERIVATIVE

Franz Häfliger and Walter Schindler, Basel, Switzerland, assignors to J. R. Geigy A. G., Basel, Switzerland, a Swiss firm No Drawing. Application April 28, 1952, Serial No. 284,820. In Switzerland May 28, 1951

1 Claim. (Cl. 260—309.6)

It has been found that a new derivative of iminodibenzyl with interesting pharmacological properties is obtained if iminodibenzyl is reacted with 2 - halogenmethyl - imidazoline to form N-[imidazolinyl-(2)-methyl]-iminodibenzyl.

If desired, the reaction may be performed in an inert solvent such as, for example, benzene hydrocarbons and also acid binding agents such as, for example, alkali carbonate may be added, but good yields are also obtained if iminodibenzyl is heated with a salt of a 2-halogenmethyl-imidazoline without any other additive. The yield is calculated on the amount of iminodibenzyl used.

The new compound is of pharmacological interest, e. g. it has a good anti-allergic and also an analgetic action. It easily forms salts, some of which are water soluble, with inorganic and organic acids such as, for example, hydrochloric acid, hydrobromic acid, sulphuric acid, phosphoric acid, ethane disulphonic acid, acetic acid etc.

The following example further illustrates the invention. Parts are given as parts by weight and the relationship of parts by weight to parts by volume is that of grammes to cubic centimetres. The temperatures are given in degrees Centigrade.

Example 48 parts of iminodibenzyl and 26 parts of 2-chloromethyl-imidazoline hydrochloride are well mixed in a mortar and then heated for 6 hours while stirring at 135–140° (inner temperature). After this time the reaction product is cooled to 100°, 100 parts by volume of water are added dropwise and the whole is brought to the boil. The aqueous solution of the reaction product is separated hot from the undissolved iminodibenzyl and the latter is brought to the boil twice with 50 parts by volume of water each time. The three aqueous solutions are combined, filtered and cooled with ice whereupon the hydrochloride of N - [imidazolinyl - (2) - methyl] - iminodibenzyl crystallises out. It is filtered off under suction and recrystallised from alcohol. The melting point is 268–270°. The iminodibenzyl which has not reacted can be used again.

What we claim is:

N-[imidazolinyl-(2)-methyl]-iminodibenzyl.

FRANZ HÄFLIGER.
WALTER SCHINDLER.

No references cited.